(12) United States Patent
Chen et al.

(10) Patent No.: US 10,073,569 B2
(45) Date of Patent: Sep. 11, 2018

(54) INTEGRATED POLARIZER AND CONDUCTIVE MATERIAL

(71) Applicant: Apple Inc., Cupertino, CA (US)

(72) Inventors: Cheng Chen, San Jose, CA (US);
Masato Kuwabara, Tsukuba (JP);
Sunggu Kang, San Jose, CA (US);
John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 14/166,817

(22) Filed: Jan. 28, 2014

(65) Prior Publication Data

US 2015/0212614 A1    Jul. 30, 2015

(51) Int. Cl.
*G06F 3/044*    (2006.01)
*G06F 3/041*    (2006.01)
*G02B 5/30*     (2006.01)

(52) U.S. Cl.
CPC ............ *G06F 3/044* (2013.01); *G06F 3/0412* (2013.01); *G02B 5/3033* (2013.01); *G06F 2203/04103* (2013.01); *G06F 2203/04111* (2013.01)

(58) Field of Classification Search
CPC ........... G06F 3/044; G06F 2203/04103; G06F 2203/04111; G02B 5/3033
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Sejoon Ahn
(74) *Attorney, Agent, or Firm* — Morrison & Foerster LLP (57) ABSTRACT

A polarizer integrated with conductive material and a process for forming a polarizer integrated with conductive material are disclosed. A polarizer can be integrated with conductive material to form a portion of a touch sensor panel. In one example, a layer of conductive film forming either the row or column traces can be patterned on a surface of a substrate in the polarizer. In another example, the layer of conductive film can be patterned on a viewing angle compensation film of the polarizer. One or more of the polarizer's polarizing layer, protective substrates or viewing angle compensation film can act as a dielectric between the conductive material forming the rows and column traces in the stack-up. As a result, the clear polymer spacer acting as a dielectric in touch panels can be removed, reducing the thickness of the touch screen stack-up.

24 Claims, 8 Drawing Sheets

(56) References Cited

U.S. PATENT DOCUMENTS

| | | | |
|---|---|---|---|
| 6,323,846 | B1 | 11/2001 | Westerman et al. |
| 6,605,789 | B2 | 8/2003 | Chen et al. |
| 6,690,387 | B2 | 2/2004 | Zimmerman et al. |
| 6,738,115 | B1* | 5/2004 | Iijima ............... G02F 1/133555 349/113 |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 7,705,923 | B2 | 4/2010 | Jeong et al. |
| 7,920,129 | B2* | 4/2011 | Hotelling ............. G06F 3/0416 178/18.01 |
| 8,228,306 | B2 | 7/2012 | Long et al. |
| 8,243,027 | B2* | 8/2012 | Hotelling ............ G02F 1/13338 345/104 |
| 8,479,122 | B2 | 7/2013 | Hotelling et al. |
| 8,654,083 | B2* | 2/2014 | Hotelling ............. G09G 3/3648 345/173 |
| 8,736,573 | B2* | 5/2014 | Byun .................... G06F 3/0418 345/174 |
| 2003/0071784 | A1* | 4/2003 | Sato ...................... G06F 3/0338 345/156 |
| 2006/0197753 | A1 | 9/2006 | Hotelling |
| 2008/0062148 | A1* | 3/2008 | Hotelling ............ G02F 1/13338 345/174 |
| 2010/0079379 | A1* | 4/2010 | Demuynck ............. G06F 3/016 345/169 |
| 2010/0182689 | A1* | 7/2010 | Nakanishi .......... C08G 18/0823 359/485.01 |
| 2010/0321621 | A1* | 12/2010 | Kikuchi ................. G06F 3/044 349/122 |
| 2011/0193817 | A1* | 8/2011 | Byun .................... G06F 3/0418 345/174 |
| 2012/0092296 | A1* | 4/2012 | Yanase ................. G06F 3/0416 345/174 |
| 2012/0113043 | A1* | 5/2012 | Liu ........................ G06F 3/044 345/174 |
| 2012/0114919 | A1* | 5/2012 | Nakajima ............... G06F 3/044 428/203 |
| 2012/0133607 | A1* | 5/2012 | Chiu ....................... G06F 3/041 345/174 |
| 2012/0147467 | A1* | 6/2012 | Park ........................ G06F 3/044 359/488.01 |
| 2013/0114024 | A1* | 5/2013 | Kurasawa ........... G02F 1/13363 349/96 |
| 2013/0278080 | A1* | 10/2013 | Ueno ..................... H03K 17/96 307/119 |
| 2015/0212614 | A1* | 7/2015 | Chen ....................... G06F 3/044 345/174 |
| 2016/0062509 | A1* | 3/2016 | Toyoshima ......... G02F 1/13338 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

INTEGRATED POLARIZER AND CONDUCTIVE MATERIAL

FIELD

This relates generally to touch sensor panels, and more particularly, to capacitive touch sensor patterns and stack-ups in which a touch sensor panel can be integrated at least partially within a polarizer stack-up.

BACKGROUND

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Some touch panels can detect multiple touches (the touching of fingers or other objects upon a touch-sensitive surface at distinct locations at about the same time) and near touches (fingers or other objects within the near-field detection capabilities of the touch sensors), and identify and track their locations.

In some examples, capacitive touch sensor panels can be formed from rows and columns of traces on opposite sides of a dielectric. At the "intersections" of the traces, where the traces pass above and below each other (but do not make direct electrical contact with each other), the traces essentially form two electrodes. Touch panels for use over display devices can utilize a top layer of glass upon which transparent column traces of indium tin oxide (ITO) or antimony tin oxide (ATO) have been etched, and a bottom layer of glass upon which row traces of ITO have been etched. The top and bottom glass layers can be separated by a clear polymer spacer that acts as a dielectric between the row and column traces.

SUMMARY

This relates to minimizing the thickness of a touch screen stack-up. A polarizer can be integrated with conductive material to form a portion of a touch sensor panel. In one example, a layer of conductive film forming either the row or column traces can be patterned on a surface of a substrate in the polarizer. In another example, the layer of conductive film can be patterned on a viewing angle compensation film of the polarizer. The polarizer's polarizing layer, protective substrates or viewing angle compensation film can act as a dielectric between the conductive material forming the rows and column traces in the stack-up. As a result, the clear polymer spacer acting as a dielectric in touch panels can be removed, reducing the thickness of the touch screen stack-up.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to minimizing the thickness of a touch screen stack-up. A polarizer can be integrated with conductive material to form a portion of the touch sensor panel. In one example, a layer of conductive film forming either the row or column traces can be patterned on a surface of a substrate in the polarizer. In another example, the layer of conductive film can be patterned on a viewing angle compensation film of the polarizer. The polarizer's polarizing layer, protective substrates or viewing angle compensation film can act as a dielectric between the conductive material forming the rows and column traces in the stack-up. As a result, the clear polymer spacer acting as a dielectric in touch panels can be removed, reducing the thickness of the touch screen stack-up.

Figure 1:
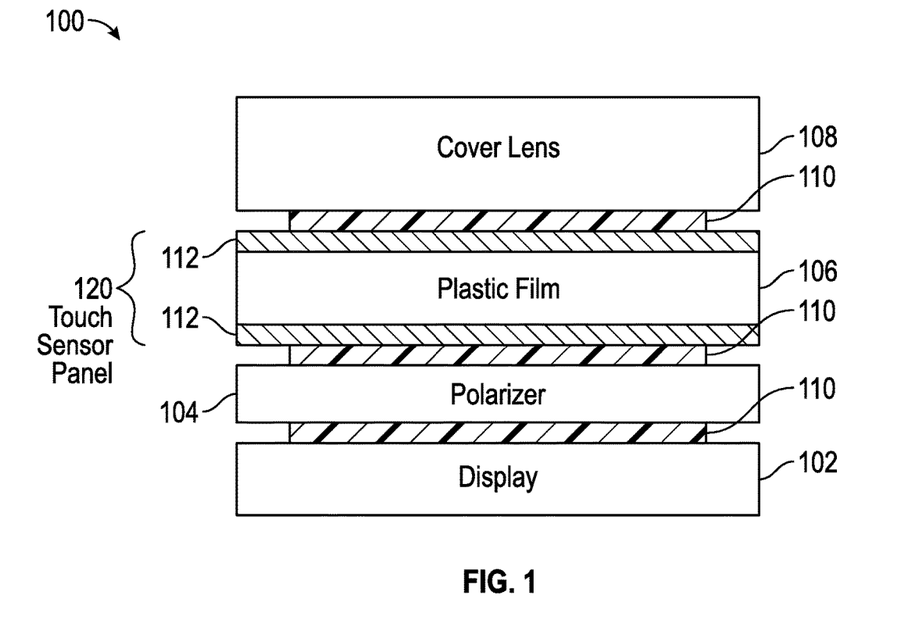
FIG. 1 illustrates an exemplary touch screen stack-up that can be used in a touch sensitive device.

FIG. 1 illustrates an exemplary touch screen stack-up that can be used in a touch sensitive device, such as a mobile phone, tablet, touchpad, portable computer, portable media player, or the like. Touch screen 100 can include a display 102, a polarizer 104, a touch sensor panel 120 and a cover lens 108. Display 102 can generate an image on the touch screen. As described in more detail below, polarizer 104 can be used to control the brightness of light emitted from the display 102. Cover lens 108 can be used as the outermost layer of the touch screen to protect the touch screen stack-up. Touch sensor panel 120 can be formed from rows and columns of transparent conductive material 112 patterned on opposite sides of a dielectric, such as transparent plastic substrate 106. The transparent plastic substrate 106 can act as a dielectric layer between the rows and columns of transparent conducting material 112. The crossing points between rows and columns of conductive material, separated by the dielectric, can form sensing regions or nodes. The transparent plastic substrate can be made from different materials such as cylco olefin polymer (COP), polyethylene terephthalate (PET), polycarbonate (PC) or the like. The transparent conducting material can be indium tin oxide (ITO) or silver nano-wire (AgNW), for example. Display 102, polarizer 104, touch sensor panel 120 and cover lens 108 can be coupled by adhesive 110.

Figure 2:
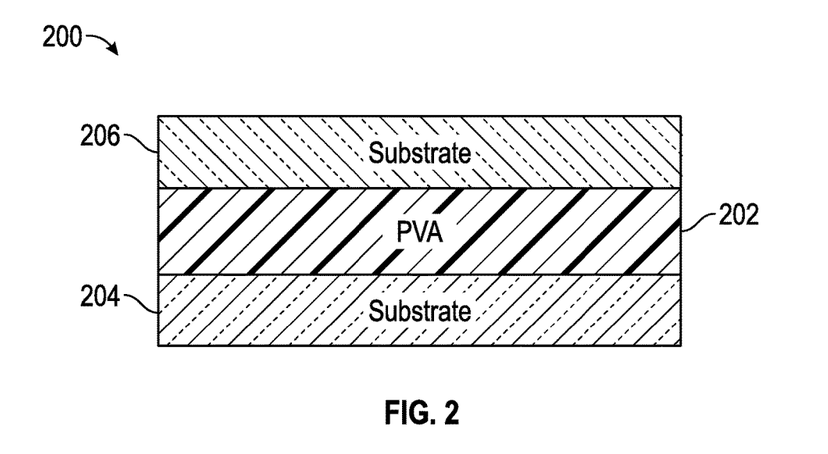
FIG. 2 illustrates an exemplary polarizer stack-up.

FIG. 2 illustrates an exemplary polarizer stack-up. Polarizer 200 can include a polarizing layer, such as a polyvinyl alcohol (PVA) film 202 doped with iodine. Although examples in the disclosure refer to PVA film doped with iodine, it should be understood that polarizing layer is not limited to PVA film doped with iodine, and any suitable polarizing material can be used. The polarizer PVA film 202 can be disposed between two substrate layers 204, 206 to protect the PVA film 202. The protective substrate layers can be made from materials including COP, PC, acrylic, triacetyl cellulose (TAC) or the like. The PVA film 202 and substrate layers 204, 206 can be coupled using an adhesive and a lamination process. The PVA film 202 can be 5-35 μm and the protective substrate layers can be between 20-80 μm.

The touch sensor panel 120 or a portion of thereof can be integrated with polarizer 104, 200 as discussed below. Integrating the touch sensor panel 120 with the polarizer 104, 200 can reduce the thickness of the touch screen stack-up because transparent plastic substrate 106 can be eliminated from the stack-up. Reducing the thickness of the touch screen also provides the added benefit of reducing the weight of the device.

Figure 3:
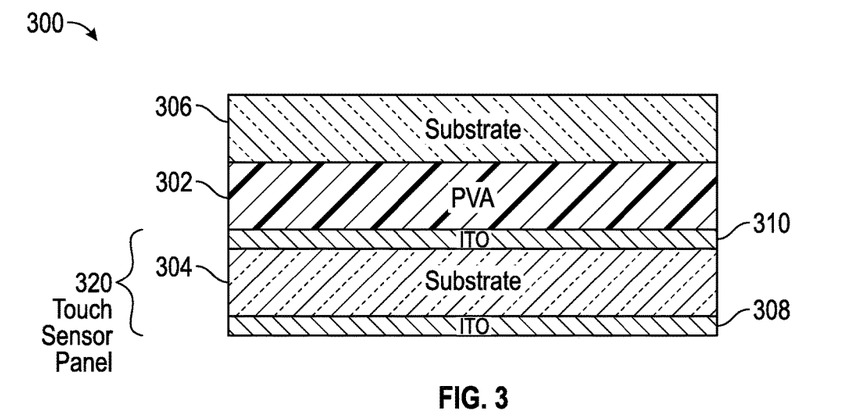
FIG. 3 illustrates an exemplary polarizer with integrated touch sensor panel that can be formed according to some disclosed examples.

FIG. 3 illustrates an exemplary polarizer with integrated touch sensor panel 300 that can be formed according to some disclosed examples. Transparent conductive material 308, such as ITO, can be patterned on the lower surface of substrate 304. Transparent conductive material 310 can be patterned on the upper surface of substrate 304. The two layers of transparent conductive material 308, 310 separated by substrate 304 form the electrodes of the touch sensor panel 320. Substrate 304 acts as the dielectric material between the layers of transparent conductive material 308, 310. The electrodes can be connected to circuitry and other components using a flex circuit (not shown) to drive and sense the electrodes and to detect touch and hover events. The polarizer can be formed by laminating the PVA film 302 to substrate 306 and touch sensor panel 320 using adhesive.

Figure 4:
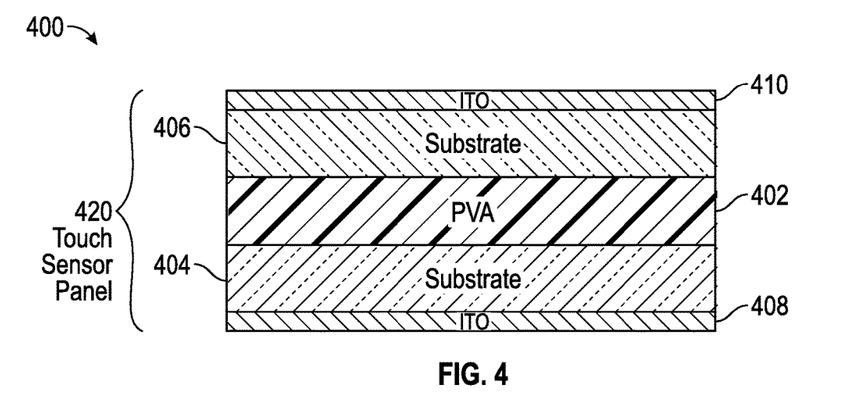
FIG. 4 illustrates an exemplary polarizer with integrated touch sensor panel that can be formed according to some disclosed examples.

FIG. 4 illustrates an exemplary polarizer with integrated touch sensor panel 400 that can be formed according to some disclosed examples. Transparent conductive material 408 can be patterned on the lower surface of substrate 404. Transparent conductive material 410 can be patterned on the upper surface of substrate 406. The polarizer can be formed by laminating the PVA film 402 to substrates 404, 406 using adhesive. The two layers of transparent conductive material 408, 410 separated by substrates 404, 406 can form the electrodes of the touch sensor panel 420. Substrates 404, 406 and PVA film 402 act as the dielectric material between the transparent conductive material 408, 410. The electrodes can be connected to circuitry and other components using a flex circuit (not shown) to drive and sense the electrodes and to detect touch and hover events.

Figure 5:
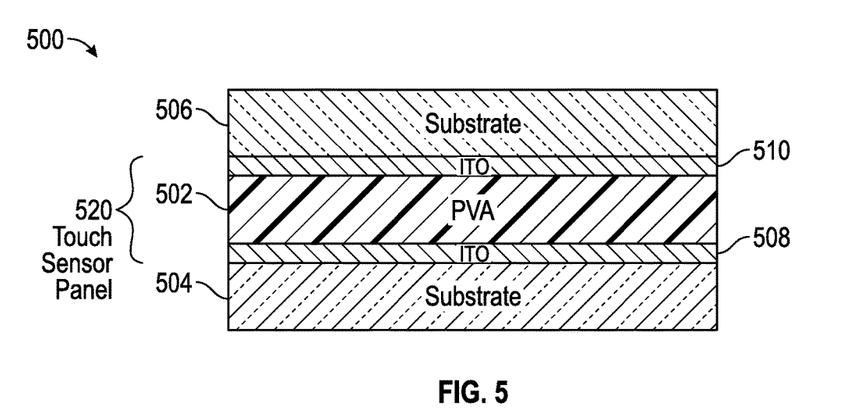
FIG. 5 illustrates an exemplary polarizer with integrated touch sensor panel that can be formed according to some disclosed examples.

FIG. 5 illustrates an exemplary polarizer with integrated touch sensor panel 500 that can be formed according to some disclosed examples. Transparent conductive material 508 can be patterned on the upper surface of substrate 504. Transparent conductive material 510 can be patterned on the lower surface of substrate 506. The polarizer can be formed by laminating the PVA film 502 to transparent conductive material 508, 510 using adhesive. The two layers of transparent conductive material 508, 510 separated by PVA film 502 can form the electrodes of the touch sensor panel 520. PVA film 502 act as the dielectric material between the transparent conductive material 508, 510. The electrodes can be connected to circuitry and other components using a flex circuit (not shown) to drive and sense the electrodes and to detect touch and hover events.

As shown in the examples of FIGS. 3-5, the two layers of transparent conductive material can be patterned on any surfaces of the two substrates as long as they are separated by either the PVA film or one or more of the substrates in order to form a pair of electrodes separated by a dielectric material. External touch sensing circuitry can be calibrated to take into account the different touch sensor panel properties resulting from differences in the geometry and dielectric material of the touch sensor panel.

In addition to the examples described above, in some examples one of the two layers of transparent conductive material can be integrated with the polarizer, and the second layer of transparent conductive material can be located elsewhere in the stack-up.

Figure 6:
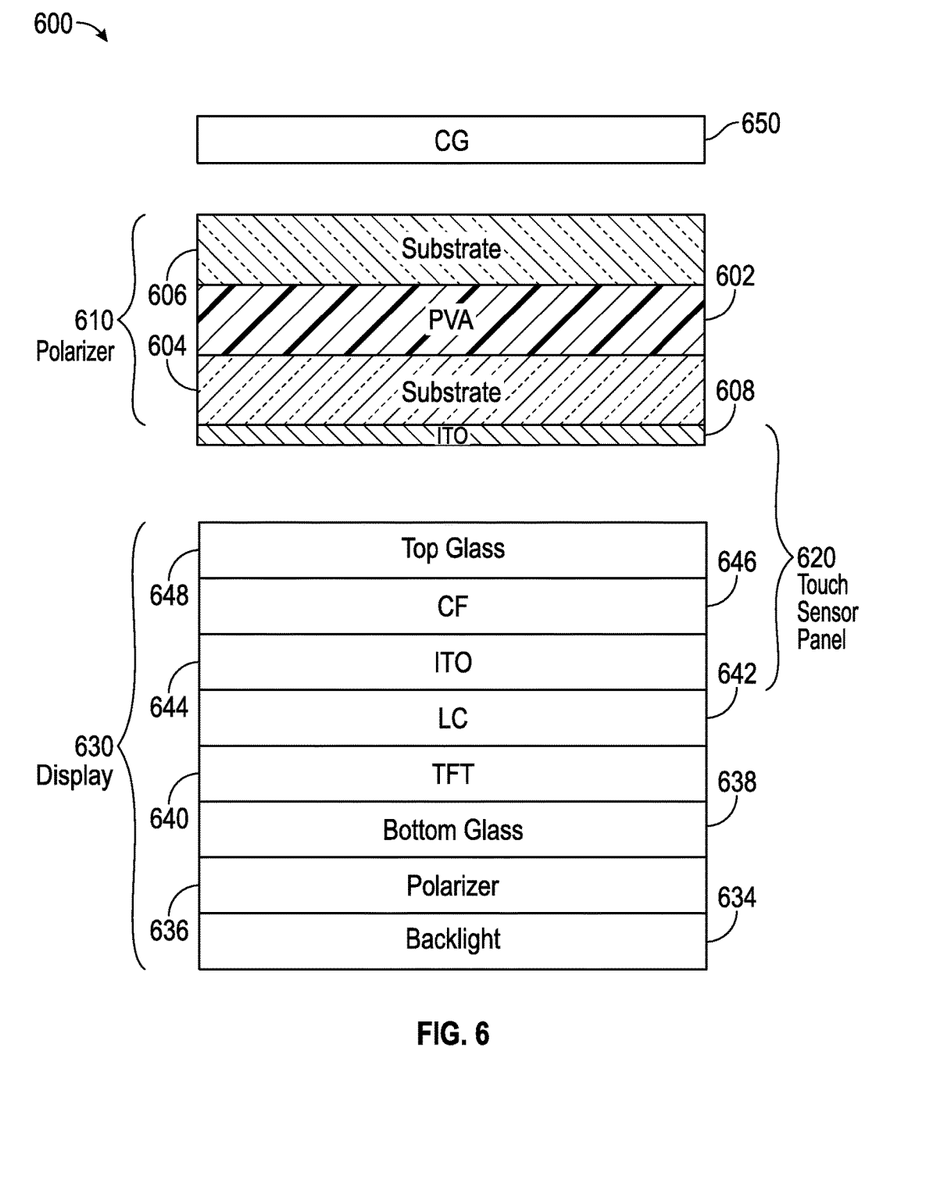
FIG. 6 illustrates an exemplary touch screen stack-up according to some disclosed examples with one layer of conductive material integrated into a polarizer and a second layer of conductive material integrated into a display.

FIG. 6 illustrates an exemplary touch screen stack-up according to some disclosed examples with one layer of conductive material integrated into a polarizer and a second layer of conductive material integrated into a display. Touch screen 600 can contain a polarizer 610 integrated with a portion of the touch sensor panel 620 and a display 630, such as LCD display. Backlight 634 can provide white light that can be directed towards the aperture of the stack-up. The backlight can supply the rest of the display stack-up with light that can be oriented in a particular orientation based on the needs of the rest of the stack-up. In order to control the brightness of the light, the white light produced by the backlight 634 can be fed into a polarizer 636 that can impart polarity to the light. The polarized light coming out of polarizer 636 can be fed through bottom cover 638 into a liquid crystal layer 642 that can be sandwiched between an ITO layer 644 and a Thin Film Transistor (TFT) layer 640. TFT substrate layer 640 can contain the electrical components necessary to create the electric field, in conjunction with ITO layer 644, that drives the liquid crystal layer 642. More specifically, TFT substrate 640 can include various different layers that can include display elements such as data lines, gate lines, TFTs, common and pixel electrodes, etc. These components can help create a controlled electric field that orients liquid crystals located in liquid crystal layer 642 into a particular orientation, based on the desired color to be displayed at any particular pixel. The orientation of a liquid crystal element in liquid crystal layer 642 can alter the orientation of the polarized light that is passed through it from backlight 634. The altered light from liquid crystal layer 642 can then be passed through color filter layer 646. The polarizer 610 can interact with the polarized light coming from liquid crystal layer 642, whose orientation can be altered depending on the electric field applied across the liquid crystal layer. The amount of light allowed to pass through polarizer 610 into cover glass 650 can be determined by the orientation of the light as determined by the orientation of the liquid crystal layer 642. Although various glass layers 638, 648, 650 are described as being made of glass, any type of transparent cover can be used including plastic, for example. By polarizing the white light coming out of backlight 634, changing the orientation of the light in liquid crystal layer 642, and then passing the light through a polarizer 610, the brightness of light can be controlled on a per pixel basis. Color filter layer 646 also can contain a plurality of color filters that can change the light passed through it into red, green and blue. By controlling the brightness and color of light on a per pixel basis, a desired image can be rendered on the display.

As mentioned above, one layer of conductive material, ITO layer 644, can be integrated into display 630. A second layer of conductive material can be integrated into polarizer 610. Transparent conductive material 608 can be patterned on the lower surface of substrate 604. The polarizer can be formed by laminating the PVA film 602 to substrates 604, 606 using adhesive. The two layers of transparent conductive material 608, 644 can form the electrodes of the touch sensor panel 620. The intermediate layers, in this example the color filter layer 646 and top glass 648, act as the dielectric material between the transparent conductive material 608, 644. The electrodes can be connected to circuitry and other components using a flex circuit (not shown) to drive and sense the electrodes and to detect touch and hover events.

Although the second layer of conductive material 608 is shown patterned on the lower surface of substrate 604, it should be understood that the second layer of conductive material can be patterned on any surface of the two substrates to form a pair of electrodes separated by a dielectric material. External touch sensing circuitry can be calibrated to take into account the different touch sensor panel properties resulting from differences in the geometry and dielectric material of the touch sensor panel.

Figure 7:
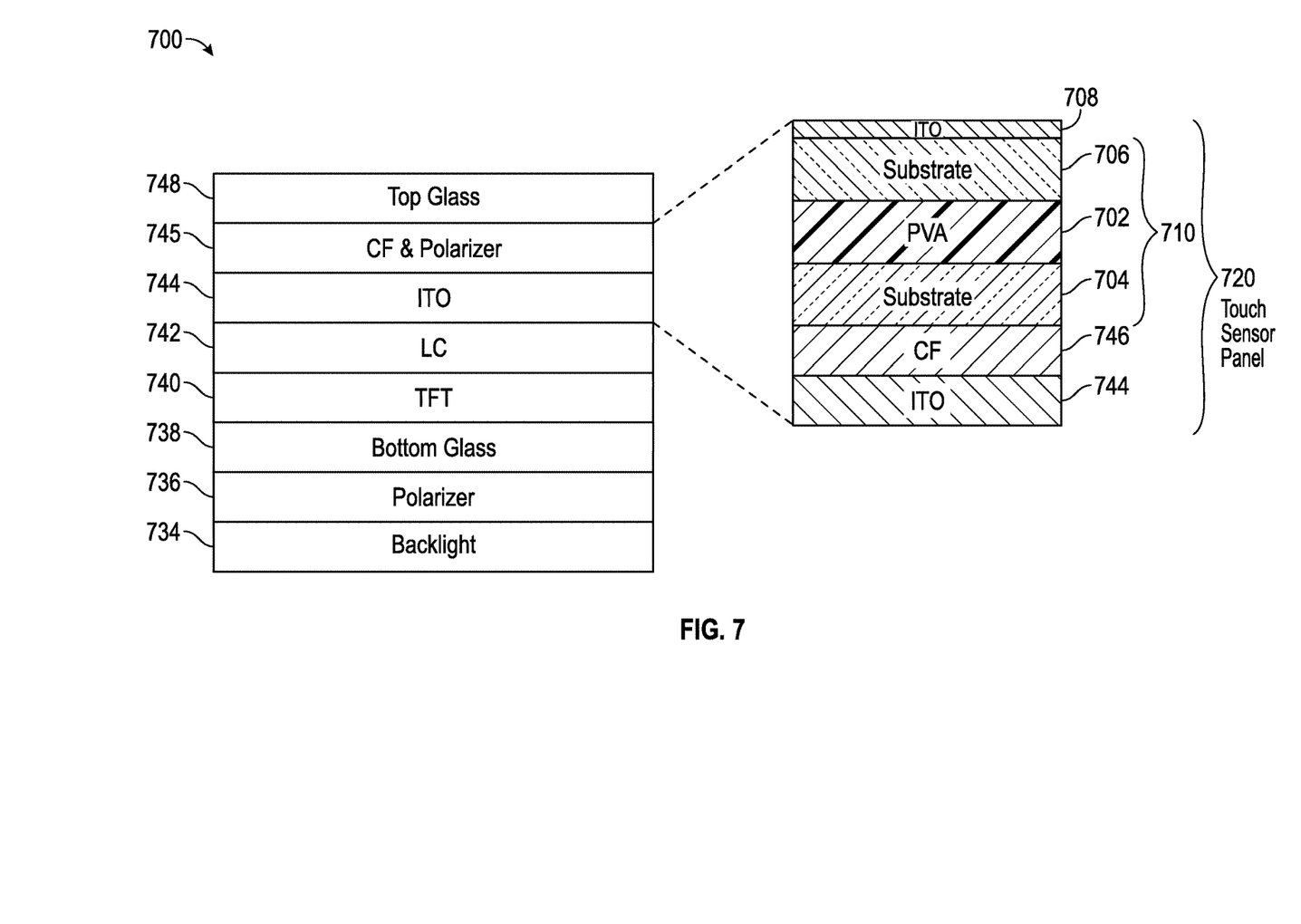
FIG. 7 illustrates an exemplary touch screen stack-up according to some disclosed examples with one layer of conductive material integrated with a polarizer within a display.

FIG. 7 illustrates an exemplary touch screen stack-up according to some disclosed examples with one layer of conductive material integrated with a polarizer within a display. Touch screen 700 can contain a polarizer 710 integrated with a portion of the touch sensor panel 720 and a display 730, such as LCD display. Backlight 734 can provide white light that can be directed towards the aperture of the stack-up. The backlight can supply the rest of the display stack-up with light that can be oriented in a particular orientation based on the needs of the rest of the stack-up. In order to control the brightness of the light, the white light produced by the backlight 734 can be fed into a polarizer 736 that can impart polarity to the light. The polarized light coming out of polarizer 736 can be fed through bottom cover 738 into a liquid crystal layer 742 that can be sandwiched between an ITO layer 744 and a TFT layer 740. TFT substrate layer 740 can contain the electrical components necessary to create the electric field, in conjunction with ITO layer 744, that drives the liquid crystal layer 742. More specifically, TFT substrate 740 can include various different layers that can include display elements such as data lines, gate lines, TFTs, common and pixel electrodes, etc. These components can help create a controlled electric field that orients liquid crystals located in liquid crystal layer 742 into a particular orientation, based on the desired color to be displayed at any particular pixel. The orientation of a liquid crystal element in liquid crystal layer 742 can alter the orientation of the polarized light that is passed through it from backlight 734. The altered light from liquid crystal layer 742 can then be passed through color filter and polarizer layer 746. Color filter and polarizer layer 745 can contain a color filter layer 746 and a polarizer 710. The polarizer 710 in color filter and polarizer layer 745 can interact with the polarized light coming from liquid crystal layer 742, whose orientation can be altered depending on the electric field applied across the liquid crystal layer. The amount of light allowed to pass through color filter layer 746 into top cover 748 can be determined by the orientation of the light as determined by the orientation of the liquid crystal layer 742. Although various glass layers 738, 748, are described as being made of glass, any type of transparent cover can be used including plastic for example. By polarizing the white light coming out of backlight 734, changing the orientation of the light in liquid crystal layer 742, and then passing the light through a polarizer 710 in color filter and polarizer layer 745, the brightness of light can be controlled on a per pixel basis. Color filter layer 746 also can contain a plurality of color filters that can change the light passed through it into red, green and blue. By controlling the brightness and color of light on a per pixel basis, a desired image can be rendered on the display.

As mentioned above, one layer of conductive material, ITO layer 744, can be integrated into display 730. A second layer of conductive material can be integrated into polarizer 710. Transparent conductive material 708 can be patterned on the upper surface of substrate 706. The polarizer can be formed by laminating the PVA film 702 to substrates 704, 706 using adhesive. The two layers of transparent conductive material 708, 744 can form the electrodes of the touch sensor panel 720. The intermediate layers, in this example the color filter layer 646, substrates 704, 706 and PVA film 702 act as the dielectric material between the transparent conductive material 708, 744. The electrodes can be connected to circuitry and other components using a flex circuit (not shown) to drive and sense the electrodes and to detect touch and hover events.

Although the second layer of conductive material 708 is shown patterned on the upper surface of substrate 706, it should be understood that the second layer of conductive material can be patterned on any surface of the two substrates to form a pair of electrodes separated by a dielectric material. External touch sensing circuitry can be calibrated to take into account the different touch sensor panel properties resulting from differences in the geometry and dielectric material of the touch sensor panel.

Figure 8:
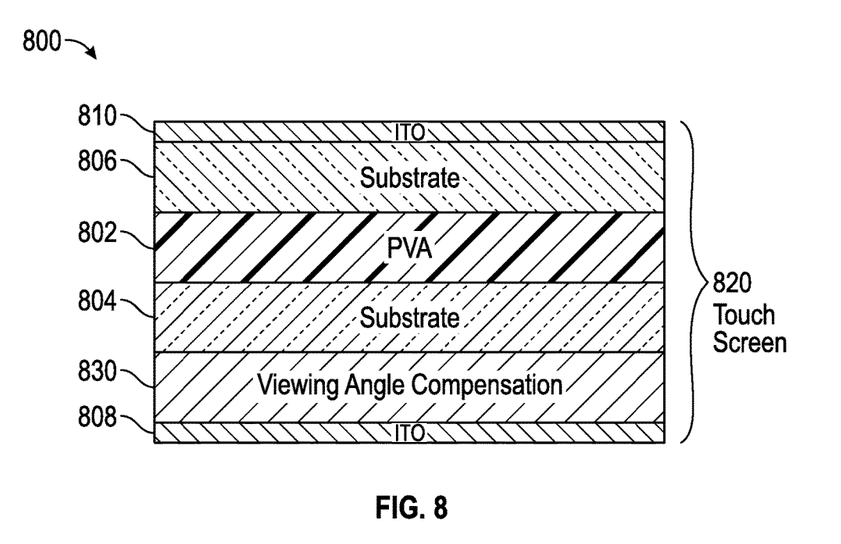
FIG. 8 illustrates an exemplary polarizer with integrated touch sensor panel that can be formed according to some disclosed examples using a viewing angle compensation film.

FIG. 8 illustrates an exemplary polarizer with integrated touch sensor panel 800 that can be formed according to some disclosed examples using a viewing angle compensation film 830. A polarizer can have a viewing angle compensation film 830. The viewing angle compensation film 830 can be made from different materials such as COP. Transparent conductive material 808 can be patterned on the lower surface of viewing angle compensation film 830. Transparent conductive material 810 can be patterned on the upper surface of substrate 806. The polarizer can be formed by laminating the various layers—PVA film 802, substrates 804, 806 and viewing angle compensation film 830—using adhesive. The two layers of transparent conductive material 808, 810 separated by substrates 804, 806 and viewing angle compensation film 830, can form the electrodes of the touch sensor panel 820. Substrates 804, 806, viewing angle compensation film 830 and PVA film 802 act as the dielectric material between the transparent conductive material 808, 810. The electrodes can be connected to circuitry and other components using a flex circuit (not shown) to drive and sense the electrodes and to detect touch and hover events.

Although the layers of conductive material 808, 810 are shown patterned on the upper surface of substrate 806 and the lower surface of viewing angle compensation film 830, it should be understood that the layers of conductive material can be patterned on any surface of the two substrates 804, 806 or the viewing angle compensation film 830 to form the touch sensor panel as long as the two layers of conductive material are separated by either the PVA film 802, viewing angle compensation film 830, or one or more of the substrates 804, 806 in order to form an electrode including two conductors and a dielectric material between the two conductors. External touch sensing circuitry can be calibrated to take into account the different touch sensor panel properties resulting from differences in the geometry and dielectric material of the touch sensor panel. Additionally, in some examples one of the two layers of transparent conductive material can be integrated with the polarizer and the second layer of transparent conductive material can be located elsewhere in the stack-up.

Figure 9A:
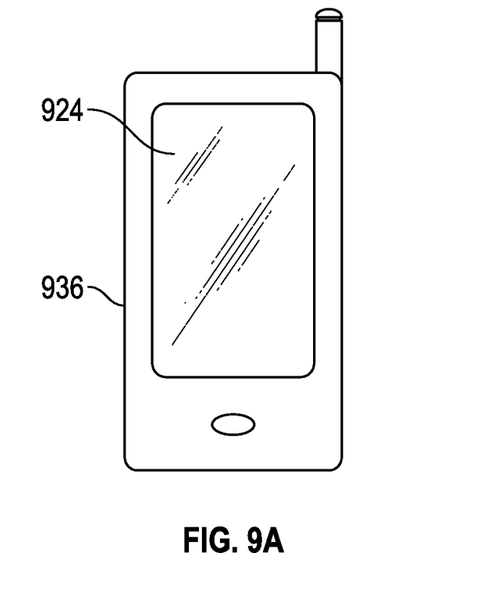
FIG. 9A illustrates an example mobile telephone that includes a touch screen with integrated polarizer according to some disclosed examples.
Figure 9B:
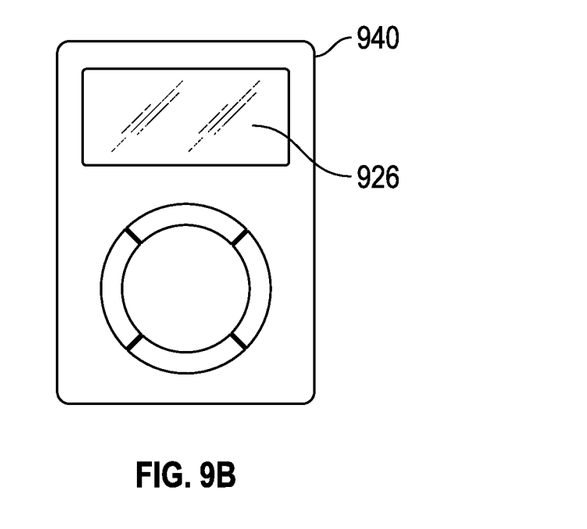
FIG. 9B illustrates an example digital media player that includes a touch screen with integrated polarizer according to some disclosed examples.
Figure 9C:
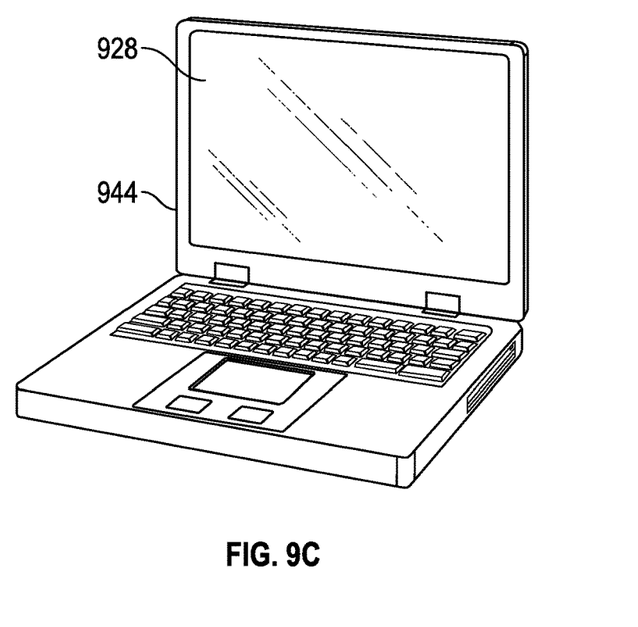
FIG. 9C illustrates an example personal computer that includes a touch screen with integrated polarizer according to some disclosed examples.
Figure 9D:
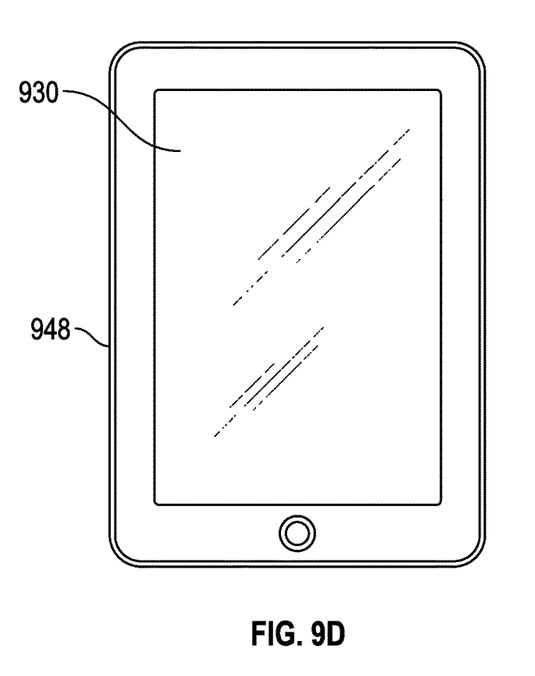
FIG. 9D illustrates an example tablet computing device that includes a touch screen with integrated polarizer according to some disclosed examples.

FIGS. 9A-9D show example systems in which polarizers integrated with conductive material of a touch screen according to examples of the disclosure can be implemented. FIG. 9A illustrates an example mobile telephone 936 that includes a touch screen 924 with integrated polarizer. FIG. 9B illustrates an example digital media player 940 that includes a touch screen 926 with integrated polarizer. FIG. 9C illustrates an example personal computer 944 that includes a touch screen 928 with integrated polarizer. FIG. 9D illustrates an example tablet computing device 948 that includes a touch screen 930 with integrated polarizer. Touch screens 924, 926, 928 and 930 can include numerous layers that are stacked on top of each other and bonded together to form the touch screen.

Figure 10:
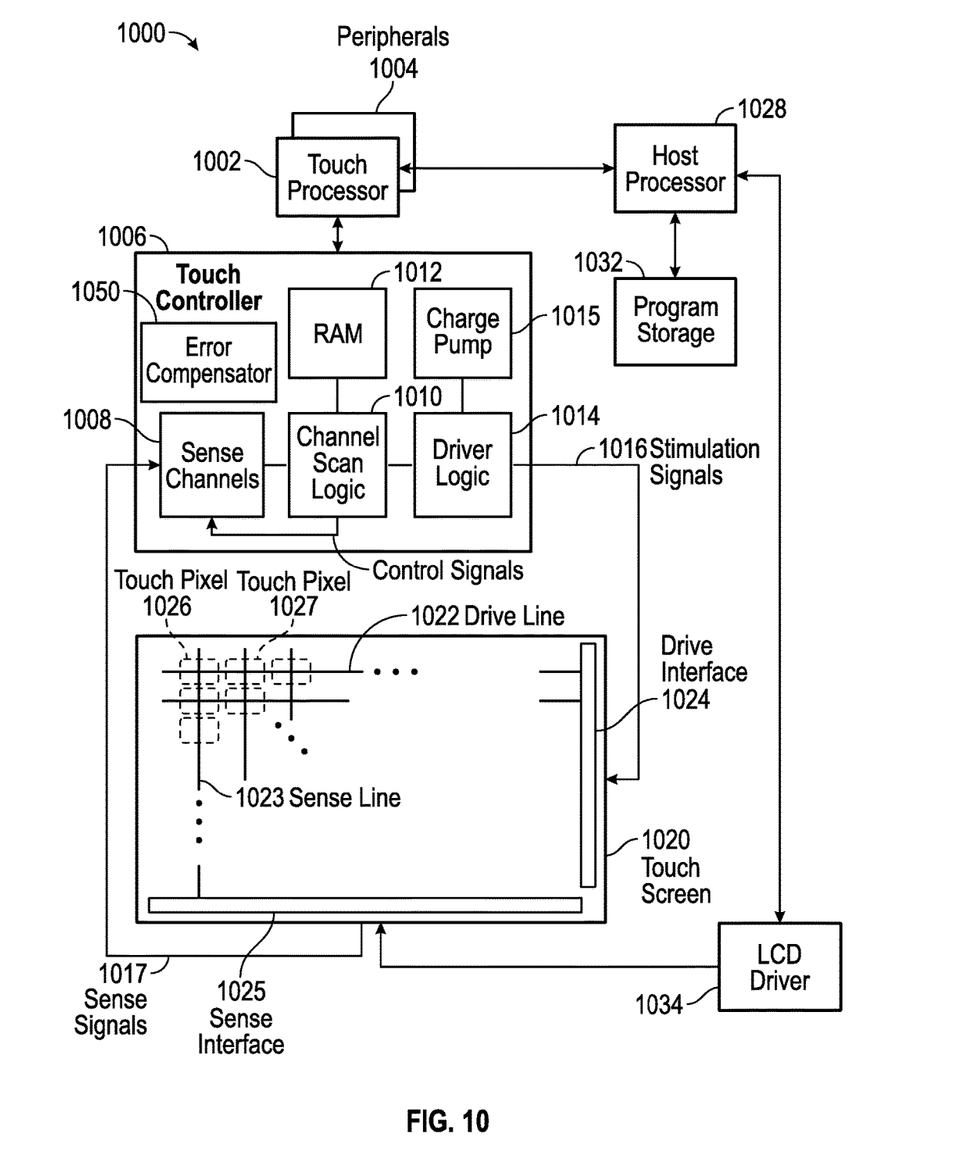
FIG. 10 is a block diagram of an example computing system that illustrates one implementation of an example touch screen 1020 with an integrated polarizer described above with conductive material according to examples of the disclosure.

FIG. 10 is a block diagram of an example computing system 1000 that illustrates one implementation of an example touch screen 1020 with an integrated polarizer described above with conductive material according to examples of the disclosure. Computing system 1000 could be included in, for example, mobile telephone 936, digital media player 940, personal computer 944, or any mobile or non-mobile computing device that includes a touch screen. Computing system 1000 can include a touch sensing system including one or more touch processors 1002, peripherals 1004, a touch controller 1006, and touch sensing circuitry. Peripherals 1004 can include, but are not limited to, random access memory (RAM) or other types of memory or storage, watchdog timers and the like. Touch controller 1006 can include, but is not limited to, one or more sense channels 1008, channel scan logic 1010 and driver logic 1014. Channel scan logic 1010 can access RAM 1012, autonomously read data from the sense channels and provide control for the sense channels. In addition, channel scan logic 1010 can control driver logic 1014 to generate stimulation signals 1016 at various frequencies and phases that can be selectively applied to drive regions of the touch sensing circuitry of touch screen 1020, as described in more detail below. In some examples, touch controller 1006, touch processor 102 and peripherals 1004 can be integrated into a single application specific integrated circuit (ASIC).

Computing system 1000 can also include a host processor 1028 for receiving outputs from touch processor 1002 and performing actions based on the outputs. For example, host processor 1028 can be connected to program storage 1032 and a display controller, such as an LCD driver 1034. Host processor 1028 can use LCD driver 1034 to generate an image on touch screen 1020, such as an image of a user interface (UI), and can use touch processor 1002 and touch controller 1006 to detect a touch on or near touch screen 1020, such a touch input to the displayed UI. The touch input can be used by computer programs stored in program storage 1032 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to touch processing.

Integrated display and touch screen 1020 can include touch sensing circuitry that can include a capacitive sensing medium having a plurality of drive lines 1022 and a plurality of sense lines 1023. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 1022 can be driven by stimulation signals 1016 from driver logic 1014 through a drive interface 1024, and resulting sense signals 1017 generated in sense lines 1723 can be transmitted through a sense interface 1025 to sense channels 1008 (also referred to as an event detection and demodulation circuit) in touch controller 1006. In this way, drive lines and sense lines can be part of the touch sensing circuitry that can interact to form capacitive sensing nodes, which can be thought of as touch picture elements (touch pixels), such as touch pixels 1026 and 1027. This way of understanding can be particularly useful when touch screen 1020 is viewed as capturing an "image" of touch. In other words, after touch controller 1006 has determined whether a touch has been detected at each touch pixel in the touch screen, the pattern of touch pixels in the touch screen at which a touch occurred can be thought of as an "image" of touch (e.g. a pattern of fingers touching the touch screen).

In some examples, touch screen 1020 can be an integrated touch screen in which touch sensing circuit elements of the touch sensing system can be integrated into the display pixels stack-ups of a display as discussed above.

Therefore, according to the above, some examples of the disclosure are directed to a polarizer stack-up comprising: a first substrate and a second substrate; a polarizing layer that can be disposed between the first substrate and second substrate; and a first layer of conductive material that can be patterned on a first surface of either the first substrate or the second substrate. The first layer of conductive material can form an electrode of a capacitive touch sensor panel and at least one of the first or second substrates can form a part of a dielectric layer of the capacitive touch sensor panel. Additionally or alternatively to one or more examples disclosed above, the polarizer stack-up further comprising a second layer of conductive material that can be patterned on a second surface of either the first substrate or the second substrate. The first and second layers of conductive material can form a pair of electrodes of the capacitive touch sensor panel. Additionally or alternatively to one or more examples disclosed above, the dielectric layer of the capacitive touch sensor panel can comprise at least one of the first or second substrates and the polarizing layer. Additionally or alternatively to one or more examples disclosed above, a second layer of conductive material can be patterned on a surface within a display. The first and second layers of conductive material can form a pair of electrodes of the capacitive touch sensor panel. Additionally or alternatively to one or more examples disclosed above, the first and second layers of conductive material can be located in the display.

Other examples of the disclosure are directed to a polarizer stack-up comprising: a first substrate; a viewing angle compensation film that can be disposed below the first substrate; a polarizing layer that can be disposed above the first substrate; and a first layer of conductive material that can be patterned on a first surface of the viewing angle compensation film. Additionally or alternatively to one or more examples disclosed above, the first layer of conductive material can form an electrode of a capacitive touch sensor panel. Additionally or alternatively to one or more examples disclosed above, the stack-up further comprising a second substrate and a second layer of conductive material that can be patterned on a second surface of either the first substrate, the second substrate or the viewing angle compensation film. The first and second layers of conductive material can form a pair of electrodes of the capacitive touch sensor panel. Additionally or alternatively to one or more examples disclosed above, a second layer of conductive material can be patterned on a surface within a display. The first and second layers of conductive material can form a pair of electrodes of the capacitive touch sensor panel. Additionally or alternatively to one or more examples disclosed above, the first and second layers of conductive material can be located in the display.

Other examples of the disclosure are directed to a method of forming a polarizer, the method comprising: locating a polarizing layer between a first substrate and a second substrate; and patterning a first layer of conductive material on a first surface of either the first substrate or the second substrate. The first layer of conductive material can form an electrode of a capacitive touch sensor panel and at least one of the first or second substrates can form a part of a dielectric layer of the capacitive touch sensor panel. Additionally or alternatively to one or more examples disclosed above, the dielectric layer of the capacitive touch sensor panel can comprise at least one of the first or second substrates and the polarizing layer. Additionally or alternatively to one or more examples disclosed above, the method further comprising patterning a second layer of conductive material on a second surface of either the first substrate or the second substrate. The first and second layers of conductive material can form a pair of electrodes of the capacitive touch sensor panel.

Other examples of the disclosure are directed to a method of forming a polarizer, the method comprising: locating a polarizing layer above a first substrate; locating a viewing angle compensation film below a first substrate; and patterning a first layer of conductive material on a first surface of either the first substrate or the viewing angle compensation film. Additionally or alternatively to one or more examples disclosed above, the method further comprising patterning a second layer of conductive material on a second surface of either the first substrate or the viewing angle compensation film. The first and second layers of conductive material can form a pair of electrodes of the capacitive touch sensor panel. Additionally or alternatively to one or more examples disclosed above, the method further comprising locating a second substrate above the polarizing layer and patterning a second layer of conductive material on a second surface of either the first substrate, the second substrate or the viewing angle compensation film. The first and second layers of conductive material can form a pair of electrodes of the capacitive touch sensor panel.

Other examples of the disclosure are directed to a polarizer integrated with a layer of conductive material forming an electrode of a touch sensor panel, the polarizer stack-up comprising: a first substrate and a second substrate; a polarizing layer that can be disposed between the first substrate and second substrate; and a first layer of conductive material that can be patterned on a first surface of either the first substrate or the second substrate. At least one of the first or second substrates forms a part of a dielectric layer of the capacitive touch sensor panel. Additionally or alternatively to one or more examples disclosed above, the polarizer stack-up further comprising a second layer of conductive material that can be patterned on a second surface of either the first substrate or the second substrate. The first and second layers of conductive material can form a pair of electrodes of the capacitive touch sensor panel. Additionally or alternatively to one or more examples disclosed above, the second layer of conductive material can be patterned on a surface within a display. The first and second layers of conductive material can form a pair of electrodes of the capacitive touch sensor panel. Additionally or alternatively to one or more examples disclosed above, the first and second layers of conductive material can be located in the display. Additionally or alternatively to one or more examples disclosed above, the dielectric layer of the capacitive touch sensor panel can comprise at least one of the first or second substrates and the polarizing layer.

Other examples of the disclosure are directed to a polarizer integrated with a layer of conductive material forming an electrode of a touch sensor panel, the polarizer stack-up comprising: a first substrate; a viewing angle compensation film that can be disposed below the first substrate; a polarizing layer that can be disposed above the first substrate; and a first layer of conductive material that can be patterned on a first surface of the viewing angle compensation film. Additionally or alternatively to one or more examples disclosed above, the stack-up further comprising a second substrate and a second layer of conductive material that can be patterned on a second surface of either the first substrate, the second substrate or the viewing angle compensation film. The first and second layers of conductive material can form a pair of electrodes of the capacitive touch sensor panel. Additionally or alternatively to one or more examples disclosed above, a second layer of conductive material can be patterned on a surface within a display. The first and second layers of conductive material can form a pair of electrodes of the capacitive touch sensor panel. Additionally or alternatively to one or more examples disclosed above, the first and second layers of conductive material can be located in the display.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A polarizer stack-up comprising:
   a first substrate and a second substrate;
   a polarizing layer disposed between the first substrate and second substrate;
   a first layer of conductive material patterned on a first surface of the first substrate; and
   a second layer of conductive material patterned on the second substrate;
   wherein the first layer of conductive material forms at least a first electrode of a capacitive touch sensor panel, the second layer of conductive material forms at least a second electrode of the capacitive touch sensor panel, and the polarizing layer forms at least a part of a dielectric layer of the capacitive touch sensor panel,
   wherein the polarizing layer is disposed between the first layer of conductive material and the second layer of conductive material.

2. The polarizer stack-up of claim 1, wherein the second layer of conductive material is patterned on a second surface of the second substrate.

3. The polarizer stack-up of claim 1, wherein the polarizer stack-up is coupled to a display stack-up.

4. The polarizer stack-up of claim 1, wherein at least one of the first or second layers of conductive material are located in a display stack-up.

5. A method of forming a polarizer, the method comprising:
   disposing a polarizing layer between a first substrate and a second substrate;
   patterning a first layer of conductive material on a first surface of the first substrate; and
   patterning a second layer of conductive material on the second substrate;
   wherein the first layer of conductive material forms at least a first electrode of a capacitive touch sensor panel, the second layer of conductive material forms at least a second electrode of the capacitive touch sensor panel, and
   the polarizing layer forms at least a part of a dielectric layer of the capacitive touch sensor panel,
   wherein the polarizing layer is further located between the first layer of conductive material and the second layer of conductive material.

6. The method of claim 5, wherein the second layer of conductive material is patterned on-a second surface of the second substrate.

7. A touch screen comprising:
   a polarizer integrated with a second layer of conductive material forming an electrode of a capacitive touch sensor panel, the polarizer stack-up comprising:
      a first substrate and a second substrate;
      a polarizing layer disposed between the first substrate and second substrate; and
      a first layer of conductive material patterned on a first surface of the first substrate;
   a third substrate; and
   the second layer of conductive material patterned on-the second substrate, or a first surface of the third substrate;
   wherein the first layer of conductive material forms at least a first electrode of the capacitive touch sensor panel, the second layer of conductive material forms at least a second electrode of the capacitive touch sensor panel, and the polarizing layer forms at least a part of a dielectric layer of the capacitive touch sensor panel,
   wherein the polarizing layer is disposed between the first layer of conductive material and the second layer of conductive material.

8. The touch screen of claim 7, wherein the second layer of conductive material is patterned on the third substrate, and wherein the dielectric layer of the capacitive touch sensor panel comprises the third substrate.

9. The touch screen of claim 7, wherein the second layer of conductive material is patterned on the third substrate, and wherein the dielectric layer of the capacitive touch sensor panel comprises the first substrate, the second substrate and the third substrate.

10. The touch screen of claim 7, wherein the third substrate is a color filter layer.

11. The touch screen of claim 7, wherein the second layer of conductive material is patterned on the first surface of the second substrate, and wherein the dielectric layer of the capacitive touch sensor panel comprises at least one of the first or second substrates and the polarizing layer.

12. The polarizer stack-up of claim 1, wherein the second layer of conductive material is configured to drive a liquid crystal layer of a display.

13. The polarizer stack-up of claim 2, wherein the first substrate and the second substrate are disposed between the first layer of conductive material and the second layer of conductive material.

14. The polarizer stack-up of claim 13, further comprising:
   an adhesive located between the first layer of conductive material and the second layer of conductive material.

15. The polarizer stack-up of claim 13, further comprising:
   a color filter array located between the first layer of conductive material and the second layer of conductive material.

16. The polarizer stack-up of claim 2, wherein the first layer of conductive material and the second layer of conductive material are disposed between the first substrate and the second substrate.

17. The polarizer stack-up of claim 16, further comprising:
   an adhesive located between the first substrate and the second substrate.

18. The method of claim 5, wherein disposing the polarizing layer between the first substrate and the second substrate includes laminating the polarizing layer to the first substrate and the second substrate using an adhesive.

19. The method of claim 5, where disposing the polarizing layer between the first substrate and the second substrate includes laminating the polarizing layer to the first layer of conductive material and the second layer of conductive material using an adhesive.

20. The touch screen of claim 1, further comprising:
   a display, wherein the second layer of conductive material is configured to drive a liquid crystal layer of the display.

21. The touch screen of claim 7, wherein the first substrate and the second substrate of the polarizer stack-up are disposed between the first layer of conductive material and the second layer of conductive material.

22. The touch screen of claim 21, further comprising:
   an adhesive located between the first layer of conductive material and the second layer of conductive material of the polarizer stack-up.

23. The touch screen of claim 7, wherein the first layer of conductive material and the second layer of conductive material of the polarizer stack-up are disposed between the first substrate and the second substrate of the polarizer stack-up.

24. The touch screen of claim 7, wherein the first layer of conductive material and the second layer of conductive material of the polarizer stack-up are disposed between the first substrate and the second substrate.

* * * * *